(12) United States Patent
König

(10) Patent No.: US 7,457,755 B2
(45) Date of Patent: Nov. 25, 2008

(54) KEY ACTIVATION SYSTEM FOR CONTROLLING ACTIVATION OF A SPEECH DIALOG SYSTEM AND OPERATION OF ELECTRONIC DEVICES IN A VEHICLE

(75) Inventor: Lars König, Ulm (DE)

(73) Assignee: Harman Becker Automotive Systems, GmbH, Karlsbad (DE)

( * ) Notice: Subject to any disclaimer, the term of this patent is extended or adjusted under 35 U.S.C. 154(b) by 624 days.

(21) Appl. No.: 11/038,694

(22) Filed: Jan. 19, 2005

(65) Prior Publication Data

US 2005/0192810 A1  Sep. 1, 2005

(30) Foreign Application Priority Data

Jan. 19, 2004  (EP)  ................... 04001014

(51) Int. Cl.
 *G10L 15/22* (2006.01)
(52) U.S. Cl. ....................................... 704/275
(58) Field of Classification Search ................. 704/275
 See application file for complete search history.

(56) References Cited

U.S. PATENT DOCUMENTS

| | | | |
|---|---|---|---|
| 4,827,520 A | 5/1989 | Zeinstra | |
| 5,594,784 A * | 1/1997 | Velius | 379/88.02 |
| 6,012,030 A | 1/2000 | French-St. George et al. | |
| 6,041,300 A | 3/2000 | Ittycheriah et al. | |
| 6,073,013 A | 6/2000 | Agre et al. | |
| 6,073,101 A | 6/2000 | Maes | |
| 6,088,671 A | 7/2000 | Gould et al. | |
| 6,138,098 A | 10/2000 | Shieber et al. | |
| 6,169,789 B1 | 1/2001 | Rao et al. | |
| 6,173,266 B1 | 1/2001 | Marx et al. | |
| 6,208,932 B1 | 3/2001 | Ohmura et al. | |
| 6,236,968 B1 | 5/2001 | Kanevsky et al. | |
| 6,246,981 B1 | 6/2001 | Papineni et al. | |
| 6,345,254 B1 | 2/2002 | Lewis et al. | |
| 6,393,403 B1 | 5/2002 | Majaniemi | |
| 6,396,481 B1 | 5/2002 | Challa et al. | |
| 6,411,934 B1 | 6/2002 | Moller et al. | |
| 6,422,522 B1 | 7/2002 | Woollen | |
| 6,453,020 B1 | 9/2002 | Hughes et al. | |
| 6,496,799 B1 | 12/2002 | Pickering | |

(Continued)

FOREIGN PATENT DOCUMENTS

EP  0 911 808 A1  4/1999

(Continued)

OTHER PUBLICATIONS

European Search Report for EP Application No. 04 00 1014 dated Nov. 18, 2004 (2 pages).

(Continued)

*Primary Examiner*—Susan McFadden
(74) *Attorney, Agent, or Firm*—Brinks Hofer Gilson & Lione

(57) ABSTRACT

A system is disclosed for controlling at least one electronic device. Each electronic device may have at least one control key. The system for controlling the electronic device may include a speech dialog system that controls the electronic device. The speech dialog system may be activated upon an operation of one or more control keys of the electronic device.

47 Claims, 9 Drawing Sheets

U.S. PATENT DOCUMENTS

| | | |
|---|---|---|
| 6,499,015 B2 | 12/2002 | Brooks et al. |
| 6,505,155 B1 | 1/2003 | Vanbuskirk et al. |
| 6,594,630 B1 | 7/2003 | Zlokarnik et al. |
| 6,598,020 B1 | 7/2003 | Kleindienst et al. |
| 6,601,029 B1 | 7/2003 | Pickering |
| 6,654,720 B1 | 11/2003 | Graham et al. |
| 6,658,388 B1 | 12/2003 | Kleindienst et al. |
| 6,704,396 B2 | 3/2004 | Parolkar et al. |
| 6,721,633 B2 | 4/2004 | Funk et al. |
| 6,741,963 B1 | 5/2004 | Badt et al. |
| 6,748,361 B1 | 6/2004 | Comerford et al. |
| 6,785,651 B1 | 8/2004 | Wang |
| 6,801,897 B2 | 10/2004 | Kist et al. |
| 6,832,196 B2 | 12/2004 | Reich |
| 6,839,670 B1 | 1/2005 | Stammler et al. |
| 6,895,242 B2 | 5/2005 | Fu et al. |
| 6,907,119 B2 | 6/2005 | Case et al. |
| 6,922,200 B1 | 7/2005 | Marques |
| 6,925,495 B2 | 8/2005 | Hegde et al. |
| 6,928,614 B1 * | 8/2005 | Everhart ............... 715/728 |
| 6,930,265 B2 * | 8/2005 | Koenig ............... 200/308 |
| 6,931,446 B1 | 8/2005 | Cox et al. |
| 6,950,793 B2 | 9/2005 | Ross et al. |
| 6,985,850 B1 | 1/2006 | Scanlan |
| 6,996,426 B2 | 2/2006 | Granberg |
| 7,036,130 B2 * | 4/2006 | Navoni et al. ............... 719/328 |
| 7,085,723 B2 | 8/2006 | Ross et al. |
| 7,099,829 B2 | 8/2006 | Gomez |
| 7,127,402 B2 | 10/2006 | Ross et al. |
| 7,146,323 B2 | 12/2006 | Guenther et al. |
| 7,165,027 B2 | 1/2007 | Kellner et al. |
| 7,171,365 B2 | 1/2007 | Cooper et al. |
| 7,174,298 B2 | 2/2007 | Sharma |
| 7,197,331 B2 | 3/2007 | Anastasakos et al. |
| 7,254,539 B2 | 8/2007 | Carberry et al. |
| 7,257,537 B2 | 8/2007 | Ross et al. |
| 2002/0067839 A1 | 6/2002 | Heinrich |
| 2002/0198699 A1 | 12/2002 | Greene et al. |
| 2003/0004725 A1 | 1/2003 | Agapi et al. |
| 2003/0005159 A1 | 1/2003 | Kumhyr |
| 2003/0040899 A1 | 2/2003 | Ogilvie |
| 2003/0191646 A1 | 10/2003 | D'Avello et al. |
| 2004/0078762 A1 | 4/2004 | Lee et al. |
| 2004/0167770 A1 | 8/2004 | Zhuo et al. |
| 2004/0194099 A1 | 9/2004 | Lamping et al. |
| 2004/0198326 A1 | 10/2004 | Hirani |
| 2004/0243419 A1 | 12/2004 | Wang |
| 2004/0249638 A1 | 12/2004 | Wang |
| 2004/0264672 A1 | 12/2004 | Paek et al. |
| 2006/0079322 A1 | 4/2006 | Bishop |

FOREIGN PATENT DOCUMENTS

| | | |
|---|---|---|
| EP | 1 054 390 A2 | 11/2000 |
| EP | 1 063 636 A2 | 12/2000 |
| EP | 1 231 798 A2 | 8/2002 |
| EP | 1 524 778 A1 | 4/2005 |
| FR | 2 808 915 | 11/2001 |
| GB | 2 343 779 A | 5/2000 |
| GB | 2 372 864 A | 9/2002 |
| WO | WO 99-57648 A1 | 11/1999 |
| WO | WO 00-52921 A2 | 9/2000 |
| WO | WO 01-41490 A1 | 6/2001 |
| WO | WO 02/05264 A1 | 1/2002 |
| WO | WO 02-087098 A1 | 10/2002 |

OTHER PUBLICATIONS

H. Maes, Stephane et al. Editors, W3C "Mutimodal Interaction Requirements", XP-002271304, obtained from the internet at, http://www.w3.org/TR/2003/NOTE-mmi-reqs-20030108 on Feb. 24, 2004, pp. 1-37.

Hickey, Marianne, Editor, W3C "Multimodal Requirements for Voice Markup Languages", XP-002271602, obtained from the Internet at, http://www.w3.org/TR/2000/WD-multimodal-reqs-20000710 on Feb. 26, 2006, pp. 1-17.

Kuhn et al., "Learning Speech Semantics with Keyword Classification Trees," CRIM, School of Computer Science, McGill University, Montreal, Quebec, Canada H3A 2A7, Apr. 1993, pp. 1155-1158.

McGlashan, Scott et al., Editors, W3C "Voice Extensible Markup Language (VoiceXML) Version 2.0", XP-002248286, obtained from the internet at, http://www.w3.org/TR/voicexml on Jul. 18, 2003, pp. 1-80.

McGlashan, Scott et al., Editors, W3C "Voice Extensible Markup Language (VoiceXML) Version 2.0", XP-002248286, obtained from the internet at, http://www.w3.org/TR/voicexml on Jul. 18, 2003, pp. 81-161.

Rudnicky et al., "Spoken Language Recognition in an Office Management Domain," ICASSP 91, vol. 2, 1991 International Conference on Acoustics, Speech, and Signal Processing, May 14-17, 1991, pp. 829-832.

S P A Ringland et al. "Multimodality—the future of the wireless user interface", XP-001171240, BT Technology Journal, vol. 21, No. 3, Jul. 2003, pp. 181-191.

* cited by examiner

KEY ACTIVATION SYSTEM FOR CONTROLLING ACTIVATION OF A SPEECH DIALOG SYSTEM AND OPERATION OF ELECTRONIC DEVICES IN A VEHICLE

BACKGROUND OF THE INVENTION

1. Priority Claim

This application claims the benefit of European Application No. 04001014.2, filed Jan. 19, 2004. The disclosure of the above application is incorporated herein by reference.

2. Technical Field

The invention relates to a system and a method for controlling an electronic device. In particular, the invention relates to a system for controlling a speech dialog system that operates at least one electronic device.

3. Related Art

Vehicles may be equipped with various electronic devices. These devices may be controllable by a speech dialog system. The electronic devices may include an audio system, a video system, a communication system, and other system such as a user information system. The electronic devices may be operable by hands and/or by the speech dialog system.

A user, particularly a driver of the vehicle, may be frequently distracted by the hand-operation of the electronic devices while driving. Because such distractions may lead to traffic accidents, the operation of the electronic devices may pose safety problems. Speech dialog systems have been developed to help overcome such safety problems. The speech dialog system allows users, including a driver or other occupants, to control electronic devices via speech commands. The speech dialog system may include a speech recognition system that identifies speech commands. The identified speech commands may be transferred to an electronic device that the users desire to operate. The speech dialog system may be typically activated via a push-to-talk lever (PTT) disposed in a certain location of a vehicle, such as a steering wheel of the vehicle. The PTT lever may be implemented by adding one more knobs or switches to a plurality of control and/or command switches.

After engaging the PTT lever, a user may choose an electronic device to be controlled. A menu may need to be implemented in the speech dialog system to allow a user to choose the electronic device. As a result, a user may additionally select and announce an electronic device he or she desires to operate prior to control the electronic device. Thus, implementation of the menu may add complications to a conventional speech dialog system such as in terms of an increased overall design of the speech dialog system and increased expenses.

Many known speech dialog systems are difficult to operate. To operate the speech dialog system, users may need to learn its functionality by reading manuals, getting training or instructions. Most users do not desire to take such learning steps because they may feel that the learning process is too time consuming. Furthermore, other users, such as users of rental vehicles, may not be aware that the vehicle is equipped with the speech dialog system. Accordingly, not many users may be able to take the full advantage of the speech dialog system.

SUMMARY

The invention provides a system for controlling an electronic device with a speech dialog system. The speech dialog system may be activated when at least one predetermined control key is operated. Regardless of knowledge and/or familiarity of a user about the speech dialog system, the speech dialog system may activate when a key of an electronic device is operated. A user may simply need to operate one or more of the control keys of an electronic device that he or she desires to power on or change a parameter for the speech dialog system to activate. The invention further provides a vehicle system such as an automobile having a system for controlling electronic devices and a speech dialog system.

The invention may further provide a method for controlling an electronic device with a speech dialog system. The method may include activating the speech dialog system for controlling at least one of the electronic devices upon operation of a control key. The method may further include activating a predetermined vocabulary set, in particular the vocabulary set corresponding to the operated electronic device. An entire vocabulary identified by the speech dialog system may not need uploading from a suitable storage device into an internal memory of the speech dialog system. The speech dialog system may use a smaller internal memory and more vocabularies relevant to a selected electronic device may be provided to a user. Therefore, the cost of the speech dialog system may be minimized.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A system is provided for controlling an electronic device with a speech dialog system. The speech dialog system controls one or more electronic devices having control keys. A user may simply need to operate one or more of the control keys of an electronic device that he or she desires to power on or change a parameter of an electronic device. The speech dialog system may be activated when at least one predetermined control key of an electronic device is operated. A user may control an electronic device with at least one control key and/or the speech dialog system. Regardless of knowledge and/or familiarity of a user about the speech dialog system, users may be able to start up and operate the speech dialog system.

Figure 1:
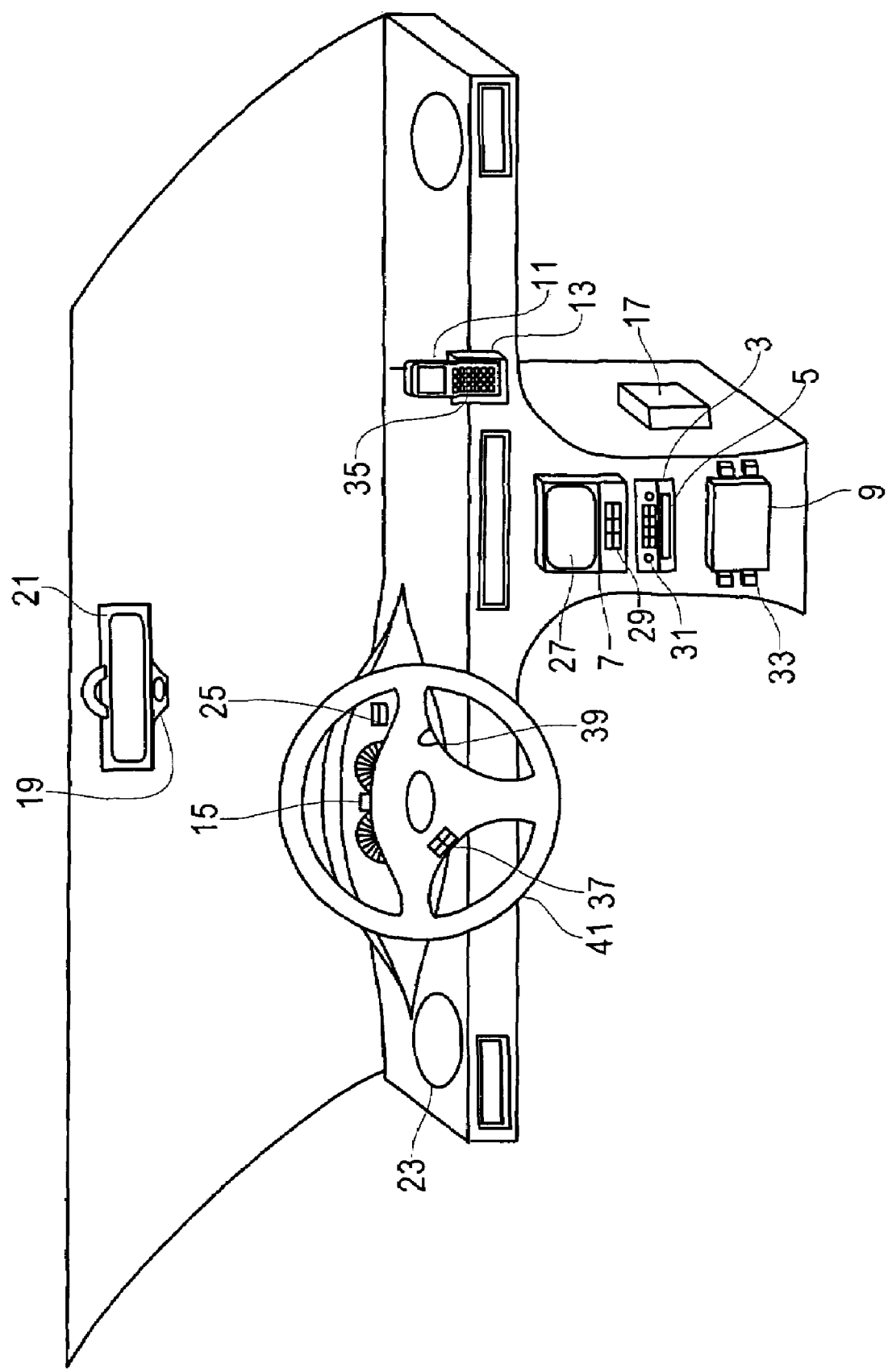
FIG. 1 shows one example of a dashboard of a vehicle.

In FIG. 1, a system for controlling an electronic device 17 is described. A cockpit 1 of a vehicle may include several electronic devices such as a radio device 3, a compact disk (CD) player 5 and a navigation system 7. The cockpit 1 may include other electronic devices such as a climate control device 9, a telephone fixed to the vehicle (not shown), a mobile telephone 11 held by a holder 13, and an on-board computer 15. Alternatively, or additionally, a digital versatile disk (DVD) player or compact cassette (CC) player may be included. The electronic devices noted above are by way of example and various other devices are possible. For example, a television, an internet connecting device, a computer game console, a board computer, etc. may be included as electronic devices. Further, an electronic device may also include windshield wipers or lights. An electronic device may be any type of electronic devices that may be operating on or with a vehicle electronic system. An electronic device may be controllable by the speech dialog system.

A system for controlling the electronic devices 17 may include a speech dialog system 18. The speech dialog system 18 is capable of operating an electronic device such as the electronic devices 3, 5, 7, 9, 11 and 15, or other electronic devices. The system 17 also may include a microphone 19 disposed on a rear mirror 21. One or more microphones 19 may be disposed at various locations of the vehicle. For example, the microphone 19 may be placed adjacent driver and passenger seats.

The electronic devices 3, 5, 7, 9, 11 and 15 may have control keys 29, 31, 33 and 35. The control keys 29, 31, 33 and 35 may control the navigation system 7, the radio and CD player device 3, the climate control 9 and the mobile telephone 11, respectively. The control keys 29, 31, 33 and 35 may switch on/off the electronic devices, change parameters of the electronic devices or perform specific functions, etc. The control keys 29, 31, 33 and 35 may be hardkeys or softkeys. A hardkey may be a control key that is related to one function of an electronic device, whereas a softkey may control more than one function depending on the current status the electronic device. A hardkey may be a switch or a knob or a push-button having normally one device parameter linked thereto. A softkey may correspond to a key which may have various functions depending on the current state of an electronic device. For example, a single softkey may be used to select an electronic device on an overview menu and change a device parameter of a selected electronic device. In addition, control keys 37, 39 may be provided on or in the vicinity of a steering wheel 41.

A driver may operate the control keys 37 and 39 with his or her hands on the steering wheel 41. The operation of a control key may have an electronic device perform the corresponding function. The control key 37 may power on electronic devices, switch between electronic devices or control specific functions of electronic device such as changing volume, inserting a new destination input for the navigation system 7, and changing temperature of the climate control. A control key may be operated by pushing, turning, switching or any other operation.

The control key 39 may represent a push-to-talk (PTT) key allowing a user to power on and off the speech dialog system 18. Alternatively, or additionally, a user may power the speech dialog system on and off by operating one of the control keys 29, 31, 33, 35 and 37 of the electronic devices. The control key 39 may be a hardkey for powering on and/or powering off the speech dialog system 18. This key may be placed at a suitable place, for example, at the steering wheel for convenient and safe operation. The control key 39 may allow the user to activate or power off the speech dialog system 18, independent of operating a control key such as control keys 29, 31, 33 and 35 of an electronic device.

The speech dialog system 18 may be automatically activated by switching on an electronic device controllable by the speech dialog system. This may allow a user to control an electronic device via speech commands. Even if a user is not familiar with the speech dialog system 18, he or she may be able to control an electronic device via speech commands with the operation of the on/off switch of an electronic device. For example, a user may try to change operations of the radio system, such as changing a volume level or searching radio stations. By doing so, the speech dialog system 18 may be also activated. If a user is searching for a certain radio station, instead of pushing a radio station search key repeatedly, a user may issue relevant speech commands such as "next radio station" to find the desired radio station. When activated, the speech dialog system may be constantly powered on or powered on from a standby state. If an electronic device is not switched on, an operation of controls keys other than an on/off key may not activate the speech dialog system.

The control keys may be configured to operate in various manners to activate the speech dialog system 18. The operation of the control keys may allow users to selectively activate the speech dialog system 18. If the control key is pressed for longer than a threshold period of time, the speech dialog system 18 may be activated. Alternatively, or additionally, the speech dialog system 18 may be activated only if users press the control keys briefly. Further, users may activate parameters linked to the control key. Various operations of the control key to activate the speech dialog system and/or parameters linked to the control key may be possible.

The speech dialog system 18 may include a vocabulary set that is used with electronic devices. The vocabulary set may always be active or the speech dialog system 18 may be configured to activate the vocabulary set when a predetermined control key of an electronic device is operated. For example, when a user powers on a radio system, he or she may want to control functions of the radio system. A vocabulary set that corresponds to only a radio system may be activated. A restricted vocabulary set implemented with a slower analysis algorithm or module may be used in the speech dialog system 18 to minimize expenses. It may not be necessary to upload into an internal memory of the speech dialog system 18 the entire vocabulary identified by the speech dialog system 18. It may be possible to use a smaller internal memory because not all vocabulary is needed to be stored at one time. Also, it may be possible to provide more vocabularies that can be understood by the speech dialog system 18 in connection with an electronic device.

When a first electronic device is powered on, the speech dialog system 18 may be configured to power on a second electronic device or switch the first electronic device to the second electronic device upon operation of a control key of the first electronic device. The operation of the control key may activate a vocabulary set and the second electronic device may receive a corresponding speech command from the speech dialog system 18. Accordingly, even if a user operates a control key of the first electronic device by mistake, he or she may power on or switch to the second electronic device that a user desires to operate. For example, a user may operate a volume key of a radio system to activate the speech dialog system 18 and gives a speech command 'climate control' to control a climate control device. In such a way, the user may operate an electronic device that is not reachable by using the power-on state of other electronic devices.

Vocabulary sets for an electronic device may also include certain commands to control functions of other electronic devices. Commands may include power-on/off commands and other commands and allow a user to perform certain actions related to other devices. For example, the vocabulary set of a radio system may include an order related to a CD player such as "change to a first song" or an order related to a telephone such as "call the number 123-4567" upon activation of a control key of a radio system.

The system 17 for controlling electronic devices may include an output device such as a loudspeaker 23 and/or a status indicator 25. The status indicator 25 may be located in plain view of a driver. A multimedia screen 27 may be a part of the navigation system 7. The output device may be audio and/or visual devices and configured to output a message after the speech dialog system 18 is activated. In particular, the output device may indicate power on/off of electronic devices and/or activation of the speech dialog system 18. By outputting information to users, users may know which device is activated and whether the speech dialog system 18 is activated or not. For example, an audio message output after a key is operated could be 'speech dialog system activated' and a visual output device may include a corresponding lamp on the dashboard that is switched on or a message displayed on the multimedia screen 27.

The speech dialog system 18 may be configured to power off when a corresponding speech command is detected. The speech dialog system 18 may be terminated any time upon a speech command or in another way such as by de-pressing an on/off button. For example, users may desire to increase the volume of a radio system or a CD player, but they do not want any further operations of the speech dialog system 18 to be executed. Users may shut down the speech dialog system by issuing a corresponding speech command such as "Volume up; stop speech dialog system." To prevent unnecessary power consumption of the speech dialog system 18, it may be desirable to shut off the speech dialog system 18 automatically. This also may extend the lifespan of the speech dialog system 18. Alternatively, or additionally, the speech dialog system 18 may be configured to power off after a predetermined period if no speech command is detected.

Figure 2:
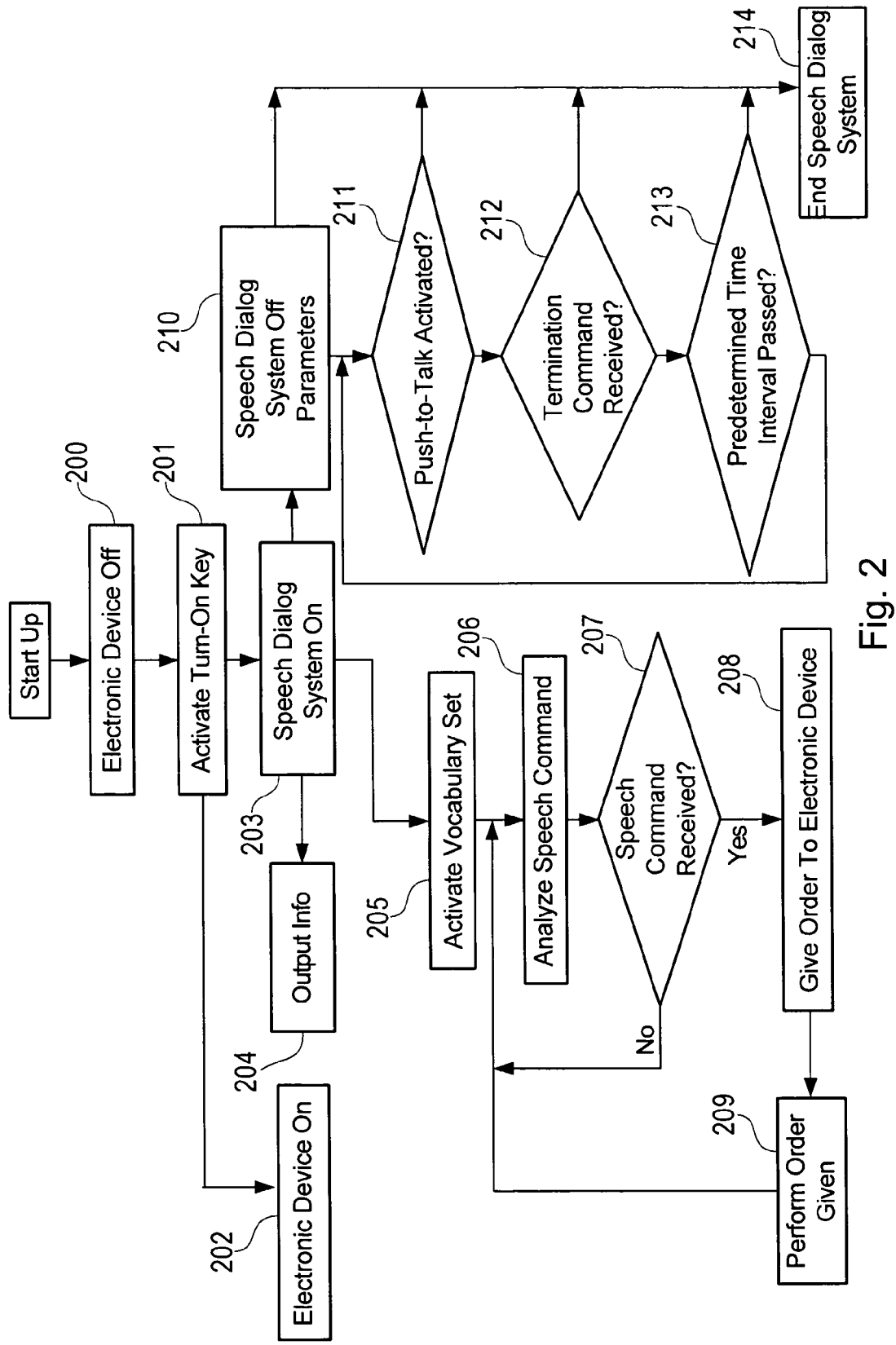
FIG. 2 is a flowchart illustrating one example operation of a speech dialog system.
Figure 3:
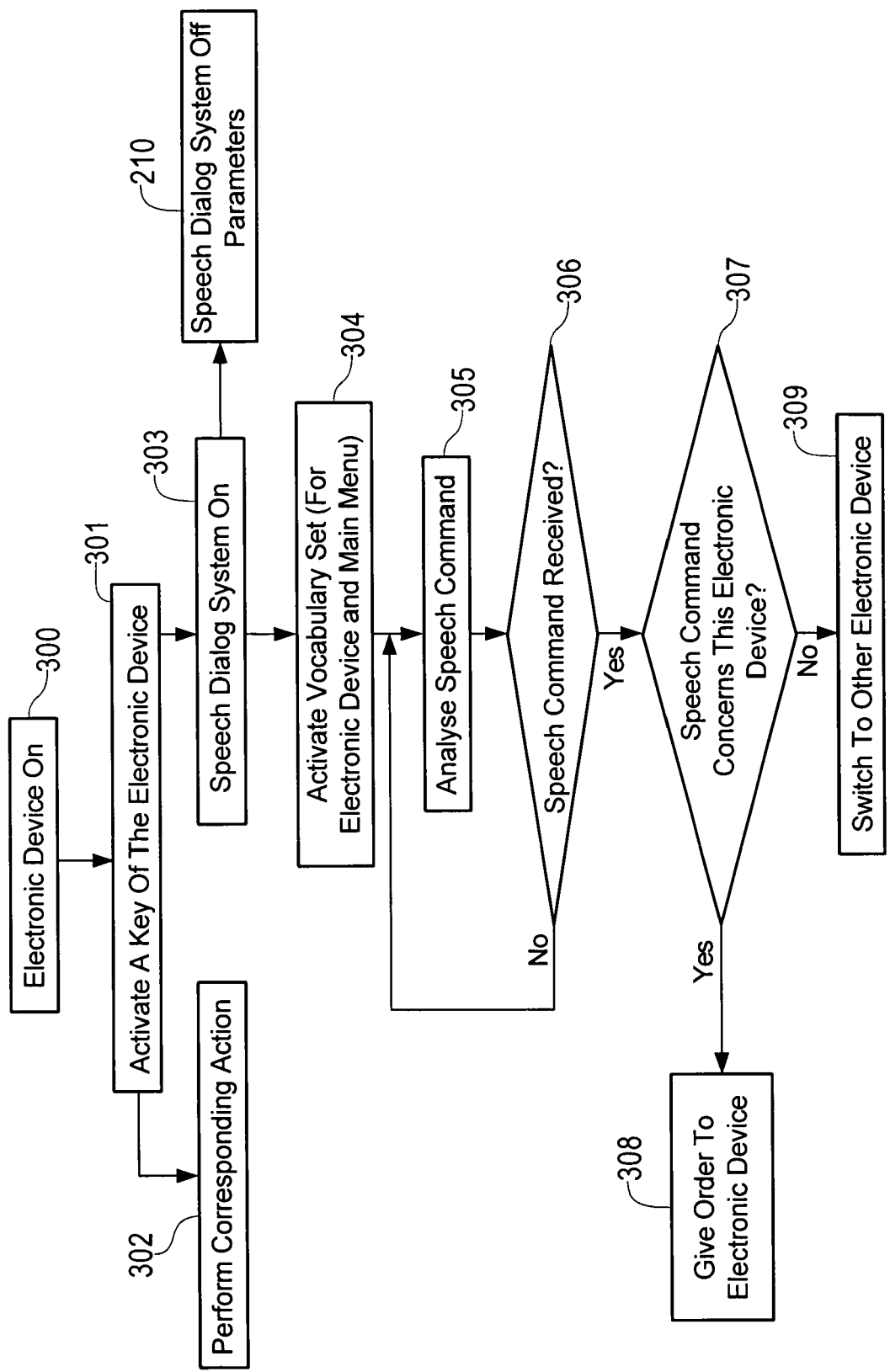
FIG. 3 is a flow chart of another example operation of the speech dialog system.

In FIGS. 2 and 3, operations of the system for controlling electronic devices 17 are described. In FIGS. 2 and 3, the operations of the system 17 may be described along with the speech dialog system 18, but various speech dialog systems are possible. FIG. 2 shows one example operation of the system for controlling electronic devices 17. At block 200, an electrical device that a user desires to operate is in an off state. In an off state, the electronic device may be either completely powered down or in a standby mode. At block 201, a user may operate a power-on key of the electronic device. The electronic device may be switched on at block 202 and substantially simultaneously, the speech dialog system 18 may be activated at block 203. At block 204, an audio or visual signal may be output via output device such as the output device 23, 25 and/or 27 (FIG. 1) to give user information that the electronic device and the speech dialog system 18 are currently switched on.

If the speech dialog system 18 is on, it may then activate a predetermined vocabulary set at block 205. The vocabulary set may contain all the vocabulary that is needed to control the electronic device which has been powered on at the block 202. The vocabulary set may be activated by uploading it from a CD-ROM or a DVD into the internal memory of the speech dialog system 18 or loading the vocabulary from a relatively slow permanent memory such as ROM into a faster type of memory.

Signals captured by a microphone such as the microphone 19 in FIG. 1 may be filtered to remove background noise and analyzed by the speech dialog system 18 to identify speech commands at block 206. At block 207, the speech dialog system 18 may determine whether a speech command is received. If no speech command is received, the speech dialog system 18 may revert to the block 206. If a speech command is received, the speech dialog system 18 may give corresponding orders to the electronic device at block 208. The electronic device carries out the orders at block 209. For example, when a user switches on the radio and gives the order, 'next radio station,' the speech dialog system 18 can analyze this speech command because the command, 'next radio station' is a part of the predetermined vocabulary set of the radio system. The speech dialog system 18 may send a signal corresponding to the order to the radio system, which in turn executes the order and switches to the next radio station.

Alternatively, or additionally, the predetermined vocabulary set may include vocabularies concerning other electronic devices. The vocabulary set with vocabularies of other electronic devices may allow a user to switch between electronic devices. For example, when a radio system is switched on and a user gives speech command 'navigation system on,' the speech dialog system is capable of understanding this command and proceed with the necessary steps and switch to the navigation system. The speech dialog system 18 activates the vocabulary set corresponding to the navigation system and terminates the radio system.

The speech dialog system 18 may be terminated upon detection of a corresponding speech command. Terminating the speech dialog system 18 may also occur if no speech command is detected during a predetermined period. Blocks 210 through 214 may be performed in parallel to the blocks 200-209 described above. Blocks 210-214 may control power-off parameters of the speech dialog system 18. Upon detection that a PTT lever, such as the PTT lever 39, has been operated at the block 211, the speech dialog system 18 may be terminated at the block 214. This type of termination may be caused by power-off of the speech dialog system or putting it in a standby mode. If no operation of the PTT lever 39 is detected, it may be determined whether there is a termination speech command received from a user at the block 212. The detected termination speech command may lead to the termination of the speech dialog system 18 at the block 214. If there is no termination speech command, it may be determined whether a predetermined time interval is passed at the block 213. If the time interval is passed, then the speech dialog system 18 may be terminated at the block 214. The blocks 211 to 213 may be repeated until one of the three is satisfied and the termination of the speech dialog system 18 may occur. The speech dialog system 18 also may be terminated when the electronic device is powered off. The termination of the speech dialog system 18 may prevent unnecessary power consumption of the speech dialog system 18 and may lead to a longer lifetime of the speech dialog system 18.

FIG. 3 illustrates another example operation of the system 17 for controlling electronic devices. One of the electronic devices may be already powered on at block 300. A user may operate one of keys of the powered-on electronic device at block 301. The electronic device may perform functions assigned to the operated key at block 302. For example, a user may operate the corresponding key to change radio stations when a radio system is on.

When the key of the electronic device is activated at the block 301, the speech dialog system 18 may be activated at block 303, such as being activated substantially simultaneously as the electronic device being activated. Output means, such as the output means 23, 25 and 27 of FIG. 1, may provide signals to inform a user of the activation of the electronic device and the speech dialog system 18. A corresponding vocabulary set may be activated at block 304. The vocabulary set may contain, for example, all the vocabulary needed to control a radio system. Alternatively, or additionally, the vocabulary set may also contain vocabulary corresponding to a main menu. The main menu may include various electronic devices to control. This vocabulary set may permit the control of other electronic devices controllable by the speech dialog system 18.

At block 305, signals that are received via a microphone, such as the microphone 19 may be filtered to remove background noise. The signals may be analyzed to detect speech commands at the block 305. If a speech command is identified at block 306, the speech dialog system may determine whether this command concerns the electronic device corresponding to the operated key, e.g. a radio system, at block 307. If the speech dialog system determines that a user wants to switch to another electronic device, the switching may be performed at block 309. Upon the switching, another electronic device may be also controllable by the speech dialog system 18.

If a speech command is related to the electronic device corresponding to the operated key at the block 301, the given order may be executed at block 308. If the speech command concerns another electronic device, the speech dialog system 18 gives the order to the other electronic device at the block 309. The order provided by the speech dialog system 18 may be configured to switch on the electronic device. Alternatively, or additionally, in case this electronic device is also already switched on, the order may activate a corresponding vocabulary set to enable another electronic device to carry out functions at the block 309.

The operation of the system 17 as shown in FIG. 3 may include the block 210 described in FIG. 2. As noted above, one of the parameters to terminate the speech dialog system 18 is determined at the block 210. Block 210 may be performed in parallel to the blocks 300-309.

Figure 4:
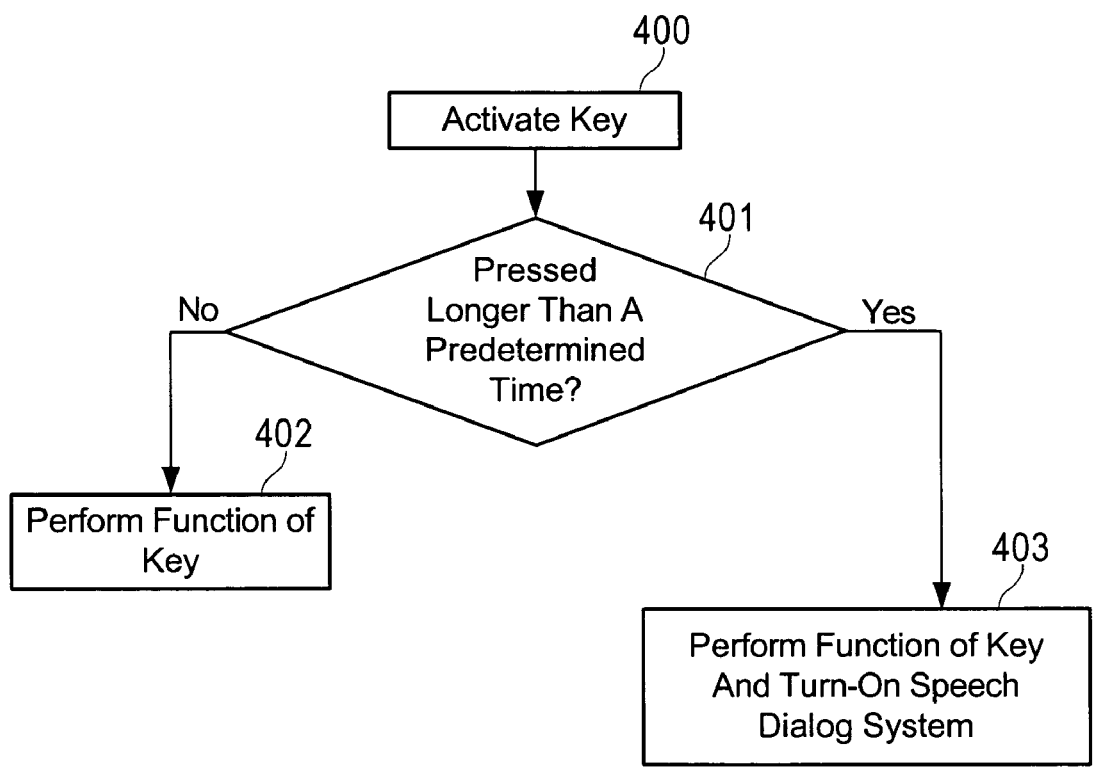
FIG. 4 shows one example operation of a control key.

FIG. 4 shows one example operation of a control key. The control key may be placed on an electronic device such as the radio system 3, the navigation system 7, etc. The control key may switch on/off, change a certain parameter of an electronic device or control various functions of an electronic device. Upon activation of the key at block 400, it may be determined whether the control key is pressed longer than a predetermined period. If the control key is pressed shorter-than a predetermined time, the function assigned to the control key concerning the electronic device is carried out at block 402. If the control key is pressed longer than that predetermined time, both the assigned function of the control key concerning the electronic device is performed and the speech dialog system 18 is activated at block 403. If an electronic device is a radio system, a user may change radio stations by pressing the control key briefly. Alternatively, if a user knows the desired radio station requires several changes of radio channels, he or she may operate the control key longer than the predetermined time. As a result, a user may activate the speech dialog system and use speech command to find the desired radio station by issuing the corresponding speech command such as 'next radio station.'

Figure 5:
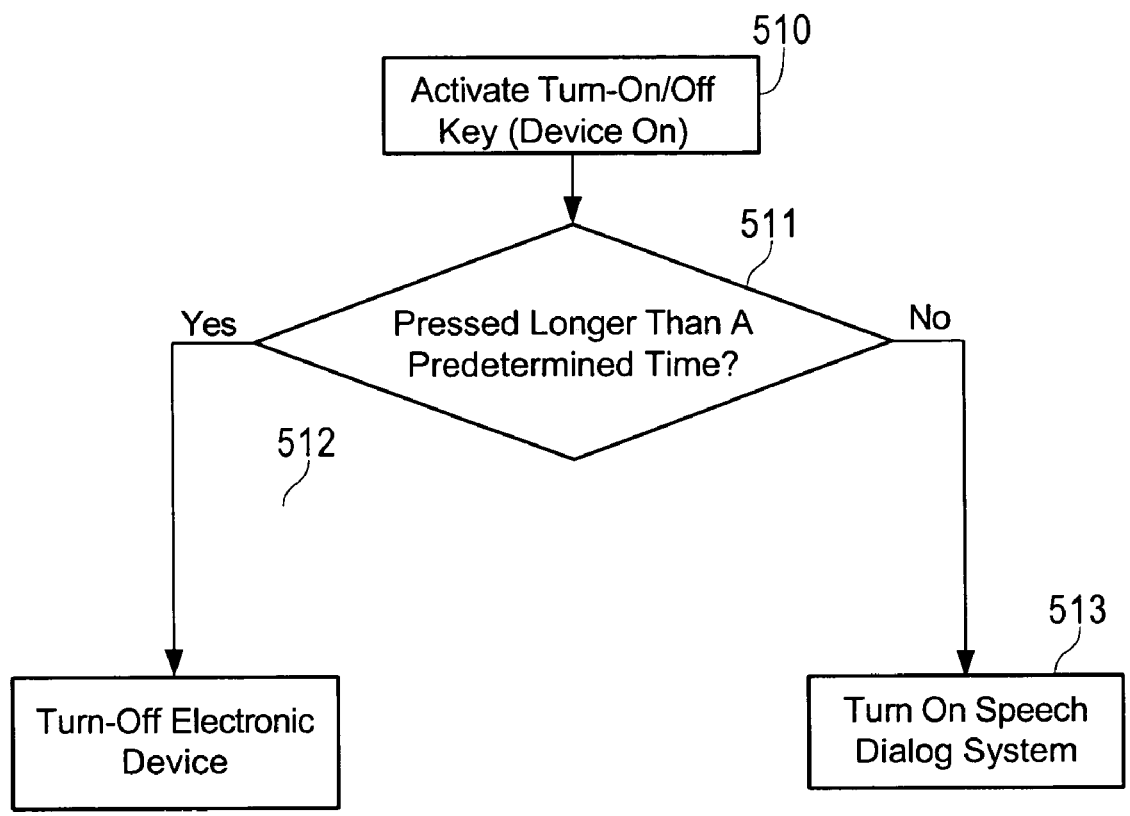
FIG. 5 shows another example operation of the control key.

FIG. 5 shows another example operation of a control key. The control key may be a power on/off key that switches on or off an electronic device. If an electronic device is switched on at block 510 and the power on/off switch is operated again, it may be determined at block 511 whether the power on/off key is operated longer than a predetermined time period or not. The predetermined time period at the block 511 may be substantially similar or different from the predetermined time period at the block 401 in FIG. 4.

If the control key is pressed longer than the predetermined time period at block 511, an electronic device may be powered off without activating the speech dialog system at block 512. If the control key is operated for shorter than the predetermined time, the speech dialog system 18 may be activated at block 513. The speech dialog system may be previously powered-off and it is again activated at the block 513. However, if the speech dialog system 18 is already powered-on, outputting means, such as the status indicator 25 of FIG. 1, may indicate to a user that the speech dialog system 18 is already activated. The operation at the block 513 may not affect an electronic device so that an electronic device may not be caused to power off.

Figure 6:
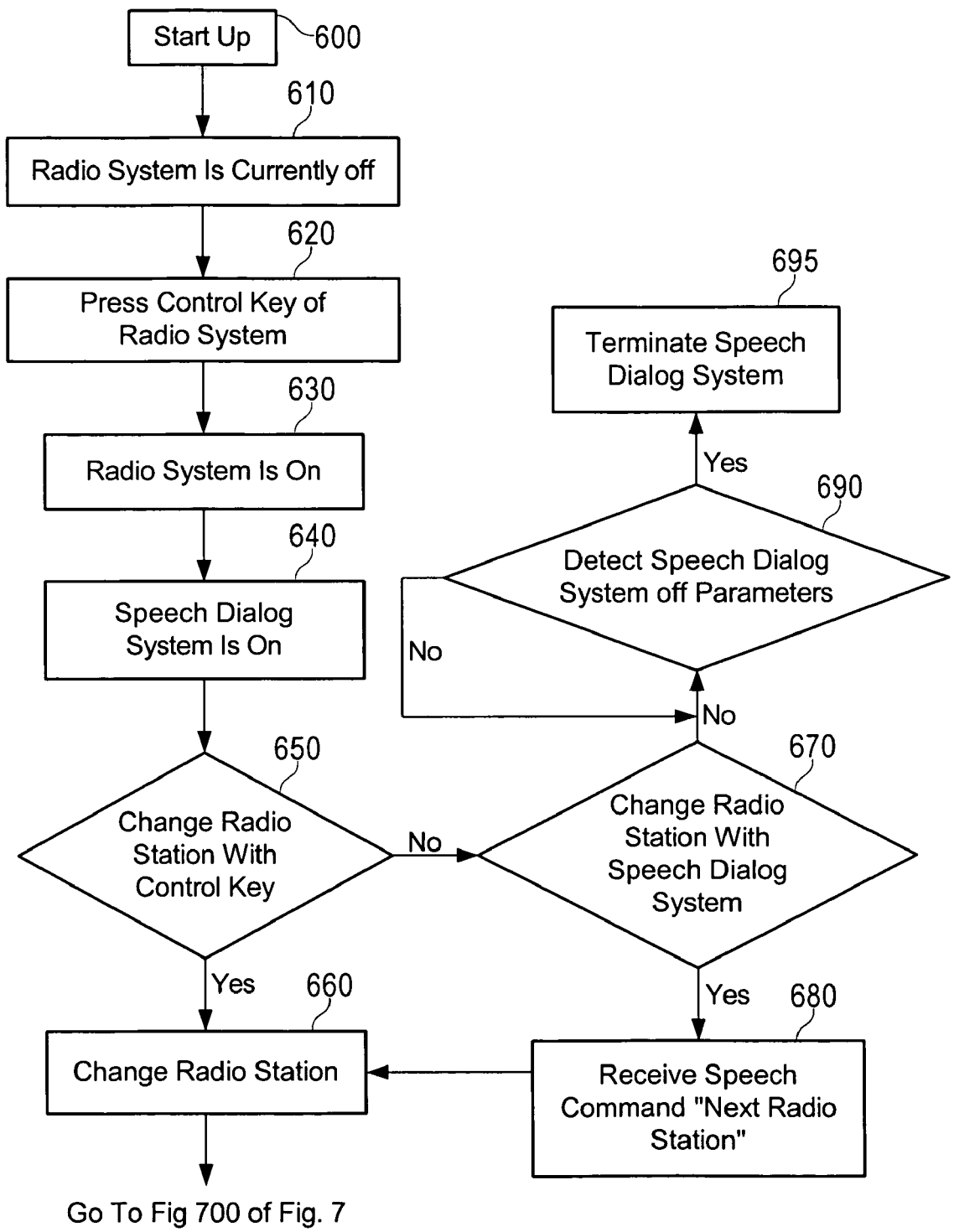
FIG. 6 shows one example operation of the speech dialog system controlling a radio system.
Figure 7:
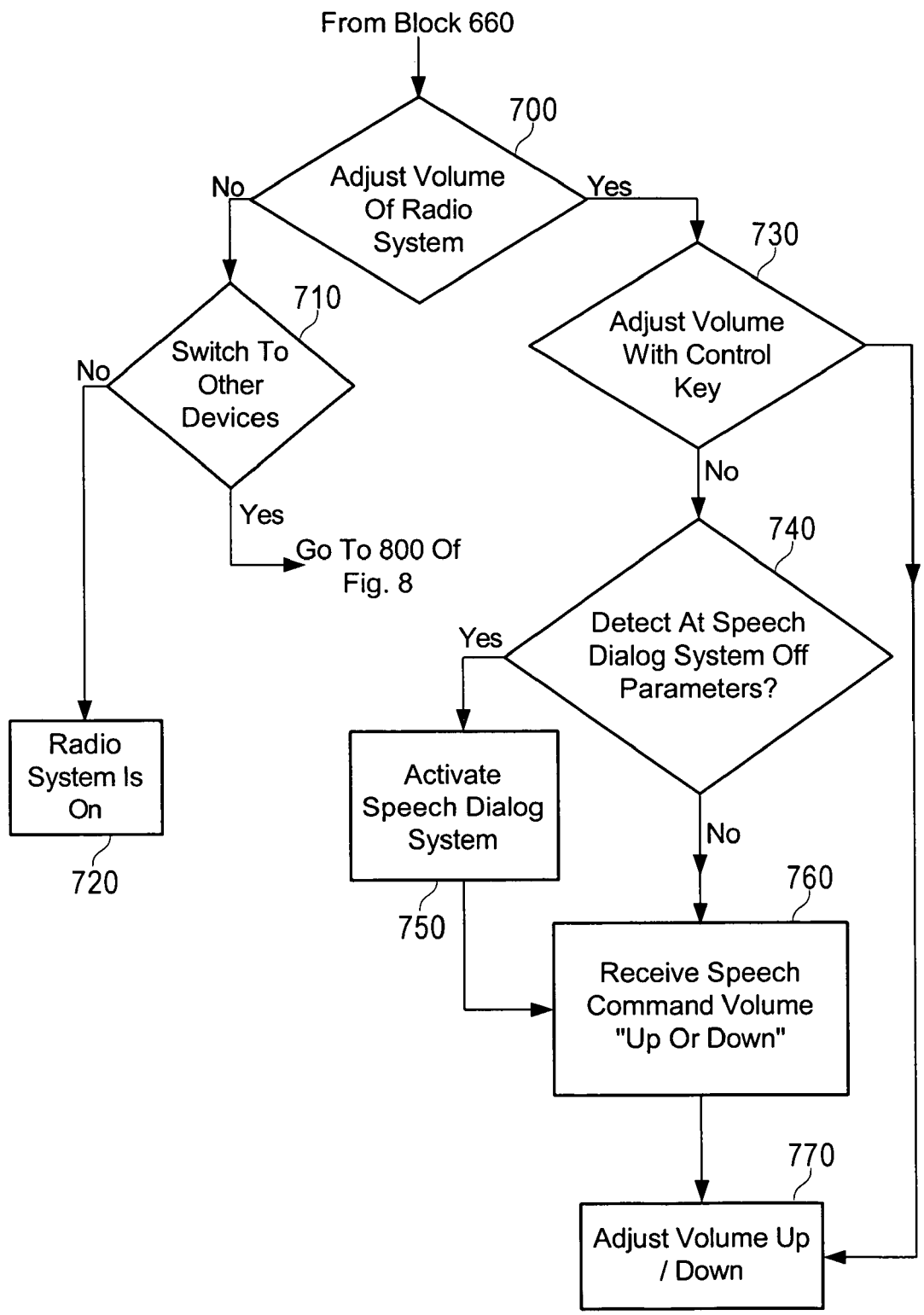
FIG. 7 shows a continuing operation of the speech dialog system of FIG. 6.
Figure 8:
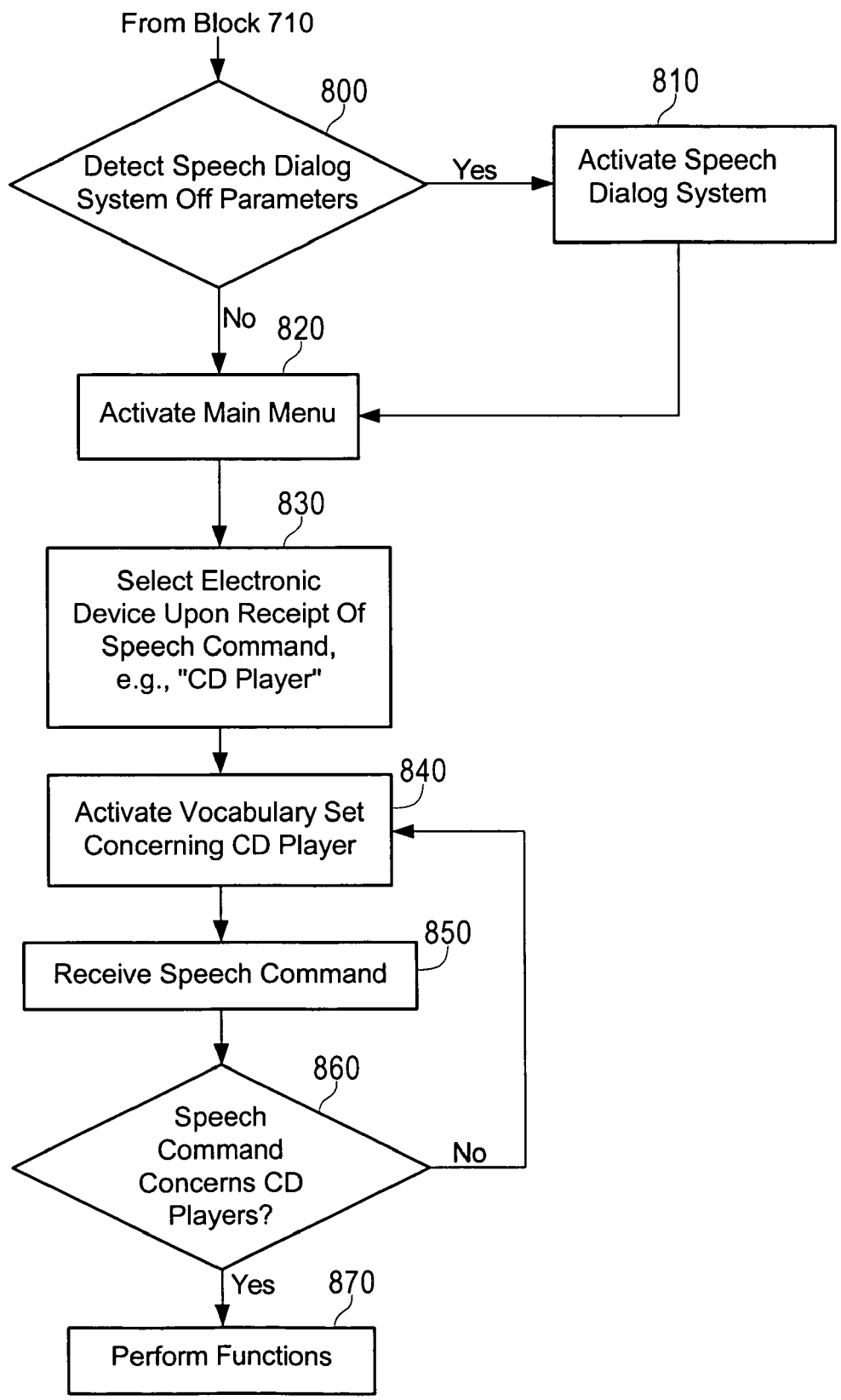
FIG. 8 shows a continuing operation of the speech dialog system of FIG. 7.

In FIGS. 6-8, an exemplary operation for controlling a radio system as an electronic device and a speech dialog system such as the speech dialog system 18 are described in detail. Only for convenience of discussion, the speech dialog system 18 may be described but various speech dialog systems are possible. FIG. 6 is a flowchart illustrating an exemplary operation involving activating the radio system and the speech dialog system 18. At block 610, the radio system is currently off. In FIG. 6, the radio system is used as an electronic device but various other electronic devices are possible. A user may desire to listen to the radio system while driving. At block 620, a user may operate a control key of the radio system. The control key may be any type of key that is linked to the function of the radio system. The control key may be placed integrally with the radio system or separately from the radio system via connecting device such as cables, wires, etc. Alternatively, or additionally, the control key may belong to another electronic device that is currently on. The operation of the control key may be switching on/off, twisting, rotating, or pressing. In this example, a user presses the control key of the radio system. As a result, the radio system is on at block 630.

When a user operates the control key, the control key may be pressed briefly or longer. Depending on a default setting, when a user presses the control key longer than a predetermined time, the radio system is switched on and substantially simultaneously, the speech dialog system 18 may be activated. If the control key is pressed very briefly, the radio system only may be switched on and the activation of the speech dialog system 18 may not be triggered.

At block 640, the control key of the radio system may trigger the activation of the speech dialog system 18 substantially simultaneously. A user may activate the speech dialog system 18 without any knowledge or training on the speech dialog system. If a user rents a vehicle and does not know availability of the speech dialog system 18, he or she may be informed of the activation of the speech dialog system 18 by output device, such as an audio message or a status indicator as shown in FIG. 1.

A user may desire to change radio stations of the radio system. A user may want to use the control key of the radio system for many reasons such as unfamiliarity of the speech dialog system, preference, etc. at block 650. If a user desires to use the control key of the radio system, he or she may simply operate the control key and change the radio stations at block 660. Another user may desire to use the speech dialog system 18. A user may feel familiar with the speech dialog system 18. The user may also know that he or she needs to operate the control key several times repeatedly. For example, because the user is searching a radio station playing a certain song, he or she switches radio stations until the song is being played. At block 670, if a user wants to change the radio station with the speech dialog system, he or she may issue speech command at block 680. The speech command may be, for instance, "next radio station." Then, the speech command, or a processed signal representing the speech commands is transmitted to the radio system, which in turn changes the radio station at block 660.

The system for controlling the radio system and the speech dialog system may constantly detect speech dialog system off parameters at block 690. The speech dialog system off parameters may include parameters described in connection with the blocks 211-213. Upon detection of any of the speech dialog system off parameters at the block 690, the speech dialog system may be terminated at block 695.

FIG. 7 is a flowchart illustrating a continuing operation of the system for operating the radio system and the speech dialog system 18. From block 660, a user may change the radio station. At block 700, a user may want to adjust volume up or down due to street noise, playing his or her favorite songs, etc. A user may change the volume by using the control key at block 730. The volume may be adjusted up or down at block 770. Although a user did not previously desire to use the speech dialog system 18, he or she may want to use it, for example, because a user cannot easily reach the volume key. At block 740, it is determined whether any speech dialog system off parameter is detected and the speech dialog system is deactivated. If the speech dialog system 18 is currently deactivated, it is again activated at block 750. If the speech dialog system 18 is activated but idle, it may receive speech command such as "volume up" or "volume down" at block 760. At the block 770, the volume may be adjusted up or down.

At the block 700, if a user does not desire to adjust the volume, the radio system may remain powered on at block 720. A user may desire to switch to other electronic devices such as a CD player, a navigation system or a DVD player at block 710. A user may issue a speech command that concerns other electronic device. For example, while the radio system is on, a user may issue a command, "Turn up heat." Such command may relate to a climate control. The speech dialog system 18 may recognize that such speech command does not relate to the radio system. The speech dialog system 18 may activate a vocabulary for a main menu. The vocabulary set for the main menu may allow a user to switch between various electronic devices. The speech dialog system 18 may recognize that the speech command relates to a climate control and may control a climate control to turn on. Alternatively, if a climate control is already on, the speech dialog system 18 may activate a vocabulary set for a climate control upon issuance of the speech command.

In FIG. 8, another example of a switching operation between electronic devices is described. FIG. 8 is a flowchart illustrating an exemplary switching operation from the radio system to a CD player. At the block 800, it is determined whether the speech dialog system off parameters are detected. This detection may be performed repeatedly and/or periodically to ensure the activation of the speech dialog system 18. If the speech dialog system 18 was deactivated, the speech dialog system is activated at block 810. Upon activation of the speech dialog system 18, a user may choose an electronic device. For example, a user may select an electronic device such as a CD player. A user may issue speech command, "CD player" at block 830. A CD player may be selected upon the receipt of the speech command. After a CD player is selected as an electronic device, a vocabulary set concerning a CD player may be activated at block 840. A user may issue speech command that is directed to a CD player. The CD player may receive the speech command at block 850. If the activated vocabulary set does not relate to a CD player at block 860, a user may not operate a CD player using the speech dialog system. The speech dialog system and the vocabulary set concerning the radio system may be activated. If the vocabulary set does not concern a CD player at block 860, a vocabulary set concerning a CD player may be activated at the block 840 and the blocks 850 and 860 may be repeated. At block 870, a CD player may perform functions corresponding to the speech command.

Figure 9:
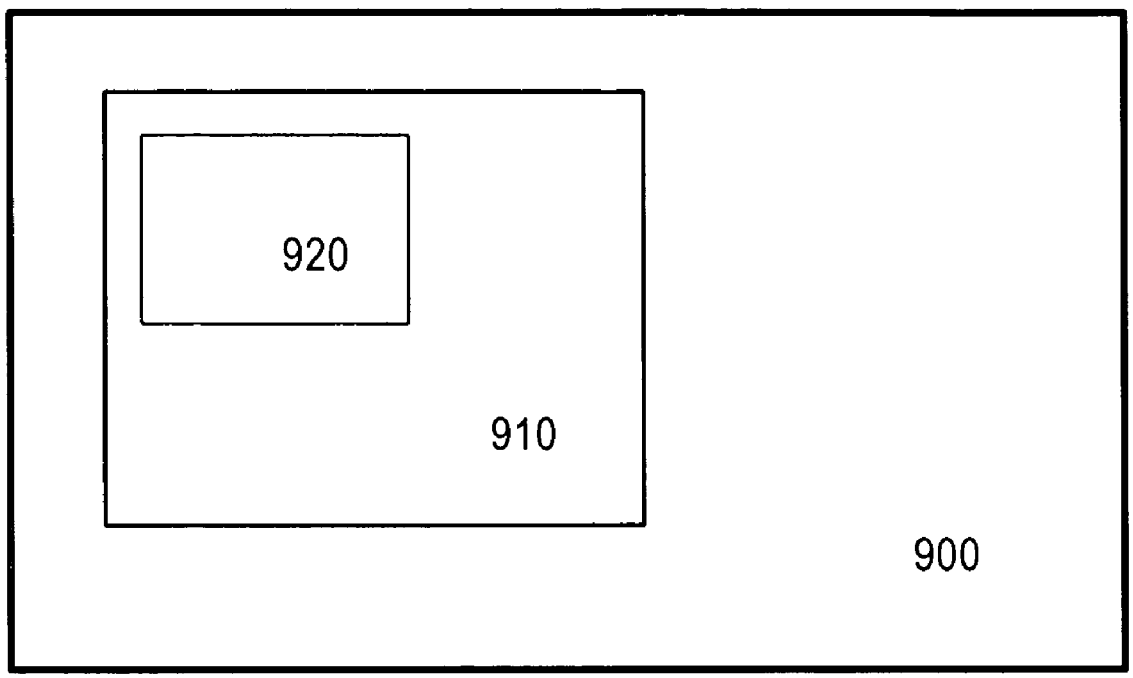
FIG. 9 is a block diagram showing a computer program product of the speech dialog system.

FIG. 9 is a block diagram showing one example of a computer program product. The computer program product 920 may be for use with a digital computer system 900. The computer program product may be directly loadable into an internal memory 910 of the digital computer system 900. The computer program may include one or more sequences of instructions for activating a speech dialog system for controlling one or more electronic device upon operation of a control key of an electronic device. For example, an electronic device and a control key may be a radio system, a CD player, a DVD players, a navigation system, a climate control device, a telephone fixed to the vehicle, a mobile telephone, a on-board computer, a television, an internet connecting device, a computer game console, etc. and keys that are linked to such electronic devices. Alternatively, or additionally, other electronic devices that may be cooperating with a vehicle electronic system may be possible.

The computer program product 920 may include a computer readable medium having computer readable program code means for activating a speech dialog system 18. The speech dialog system may control one or more electronic means such as a radio system, a CD player, etc. upon operation of a control key of an electronic means. The control key may switch on/off an electronic means or change functions/parameters of an electronic means. The computer readable medium may further include computer readable program code means for activating a vocabulary set corresponding to the operated control key. The computer readable medium also may include computer readable program means for terminating the speech dialog system 18 upon detection of a corresponding speech command, such as "terminate speech dialog system" issued by a user. Upon no detection of any speech command during a predetermined period, the speech dialog system may be terminated.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system for controlling at least one electronic device in a vehicle, the system comprising:
   a first control key that controls operation of a first electronic device;
   a second control key that controls operation of a second electronic device;
   a speech dialog system that controls the operation of the first and the second electronic devices, the speech dialog system being activated upon operation of the first control key and controlling operation of the second electronic device when the second electronic device is not reachable by a vehicle occupant.

2. The system of claim 1, where the speech dialog system generates a speech command relevant to control the operation of the second electronic device by using a power-on state of the first electronic device.

3. The system of claim 1, where the speech dialog system generates a speech command that powers on the second electronic device by using a power-on state of the first electronic device.

4. The system of claim 1, where the speech dialog system generates a speech command that switches the first electronic device to the second electronic device by operating the control key of the first electronic device.

5. The system of claim 1, where the speech dialog system is activated when the first control key is pressed longer than a threshold period of time.

6. The system of claim 1, where the speech dialog system is activated when the first control key is pressed shorter than a threshold period of time.

7. The system of claim 1, further comprising:
a predetermined vocabulary set that corresponds to one or more functions of the first electronic device, the second electronic device, or both where the predetermined vocabulary set is activated upon the operation of the first control key.

8. The system of claim 7, where the predetermined vocabulary set differs depending on an operated control key.

9. The system of claim 1, where a predetermined vocabulary set corresponds to a function of the first electronic device and comprises a restricted vocabulary set relevant to the first electronic device only.

10. A vehicle resident system for controlling at least one electronic device, the at least one electronic device comprising at least one control key, the system comprising:
a speech dialog system for controlling a first electronic device and a second electronic device, where the speech dialog system is activated when the control key of the first electronic device is operated; and,
a vocabulary set operated by the speech dialog system and including:
a first vocabulary module relevant to the first electronic device and storing a first speech command;
a second vocabulary module relevant to the second electronic device and storing a second speech command; and
a third vocabulary module relevant to the speech dialog system and storing a third speech command;
where the speech dialog system switches to control the second electronic device when the first electronic device is power-on, recognizes the second speech command and the second electronic device is not reachable by a vehicle occupant.

11. The system of claim 10, where the speech dialog system powers off the first electronic device upon receipt of the second speech command.

12. The system of claim 10, where the speech dialog system powers on the second electronic device upon receipt of the second speech command.

13. The system of claim 10, where the speech dialog system terminates operation according to the third speech command.

14. The system of claim 10, where the speech dialog system recognizes the first speech command and operates the first electronic device to perform a selected function where the speech dialog system powers on and powers off the first electronic device according to the first speech command.

15. The system of claim 14, where the speech dialog system determines whether the first speech command concerns the selected function of the first electronic device or a power-off of the first electronic device.

16. The system of claim 10, further comprising an output device configured to output a message upon the activation of the speech dialog system where the output device indicates a power-on and a power-off of the first and the second electronic devices and the activation of the speech dialog system.

17. The system of claim 16, where the output device is one of audio and visual output devices.

18. The system of claim 10, where the speech dialog system operates the first electronic device to perform a selected function according to the first speech command and terminates operation according to the third speech command where the first speech command and the third speech command are issued consecutively.

19. The system of claim 10, where the speech dialog system terminates operation according to a termination parameter for the speech dialog system including:
an activation of a hard key that powers on and powers off the speech dialog system;
a termination command included in the third speech command; and
an absence of the first, the second and the third speech command during a predetermined time interval.

20. The system of claim 10, further comprising:
a hard key for powering on and off the speech dialog system and including a push-to-talk key.

21. The system of claim 10, where the speech dialog system is activated upon operation of a first control key associated with the first electronic device and operates the second electronic device to perform a selected function upon detection of the second speech command when a second key associated with the second electronic device is not reachable.

22. The system of claim 21, where the first control key is proximate a vehicle occupant and the first electronic device is powered-on.

23. The system of claim 10, where when the control key is operated longer than a threshold time period, the speech dialog system is activated.

24. The system of claim 10, where when the control key is operated shorter than the threshold time period, the speech dialog system is activated.

25. A vehicle system comprising a system for controlling at least one electronic device having at least one control key, comprising:
a speech dialog system for controlling a first electronic device and a second electronic device, where the speech dialog system is activated upon an operation of the control key of the first electronic device is operated; and
a vocabulary set operated by the speech dialog system and including:
a first vocabulary module relevant to the first electronic device and storing a first speech command;
a second vocabulary module relevant to the second electronic device and storing a second speech command; and
a third vocabulary module relevant to the speech dialog system and storing a third speech command;
where the speech dialog system operates the first electronic device to perform a selected function according to the first speech command, switches to the second electronic device after the second speech command is received and recognized, and terminates operation according to the third speech command.

26. A computer program product for use with a digital computer, the computer program product directly loadable into an internal memory of the digital computer and including one or more sequences of instructions for:
activating a speech dialog system upon operation of a first control key associated with a first electronic device;

generating a speech command relevant to operation of a second electronic device when the second electronic device is not reachable;

powering on the second electronic device based on the speech command; and performing a selected function of the second electronic device corresponding to the speech command.

27. The computer program product of claim 26, further comprising one or more sequences of instructions for activating a predetermined vocabulary set corresponding to the first control key.

28. The computer program product of claim 26, further comprising one or more sequences of instructions for terminating the speech dialog system upon detection of a corresponding speech command relevant to the speech dialog system.

29. The computer program product of claim 26, further comprising one or more sequences of instructions for terminating the speech dialog system upon absence of detection of the speech command during a predetermined period.

30. A method for controlling at least one electronic device having at least one control key in a vehicle, the method comprising:

operating a first control key that controls operation of a first electronic device;

activating a speech dialog system upon the operation of the first control key;

generating a speech command relevant to operation of a second electronic device when the second electronic device is not reachable;

powering on the second electronic device based on the speech command; and performing a selected function of the second electronic device corresponding to the speech command.

31. The method of claim 30, further comprising activating a first vocabulary set corresponding to the first control key.

32. The method of claim 30, further comprising terminating the speech dialog system upon detection of a corresponding speech command relevant to the speech dialog system.

33. The method of claim 30, further comprising terminating the speech dialog system upon absence of detection of the speech command during a predetermined period.

34. The method of claim 30, further comprising:

activating a vocabulary set that supports the generated speech command;

receiving the speech command and recognizing the received speech command based on the activated vocabulary set;

analyzing the recognized speech command and transferring the analyzed speech command to the second electronic device; and performing the selected function ordered by the analyzed the speech command.

35. The method of claim 30, further comprising determining whether a new speech command concerns performing a new function of the first electronic device or the second electronic device.

36. The method of claim 35, further comprising switching to control the second electronic device upon the determination that the new speech command concerns performing the new function of the second electronic device.

37. The method of claim 36, further comprising terminating operation of the first electronic device by powering off the first electronic device.

38. The method of claim 30, further comprising:

issuing a new speech command relevant to the first electronic device;

activating a restricted vocabulary set relevant to the first electronic device; and performing a corresponding function ordered by the new speech command.

39. The method of claim 38, further comprising: issuing a subsequent speech command relevant to the second electronic device;

recognizing that the subsequent speech command is associated with the second electronic device; and activating another restricted vocabulary set relevant to the second electronic device.

40. The method of claim 30, further comprising detecting a receipt of at least one parameter indicating a termination of the speech dialog system at a predetermined time interval.

41. The method of claim 30, further comprising changing at least one parameter of the second electronic device based on the generated speech command recognized by the speech dialog system.

42. The method of claim 40, where detecting the receipt of the at least one parameter comprises detecting operation of a push-to-talk key that powers on and off the speech dialog system.

43. The method of claim 30, further comprising switching between the first and the second electronic devices based on a subsequent speech command recognized by the speech dialog system.

44. A method for controlling at least one electronic device having at least one control key in a vehicle, the method comprising:

determining a power-on state of a first electronic device;

operating a first control key associated with the first electronic device;

activating a speech dialog system for controlling the first and the second electronic devices upon operation of the first control key when the second electronic device is not reachable by a vehicle occupant;

receiving a first speech command relevant to the first electronic device;

activating a first vocabulary set that is relevant to the first electronic device;

performing a first function corresponding to the first speech command;

receiving and recognizing a second speech command relevant to the second electronic device;

activating a second vocabulary set that is relevant to the second electronic device; and performing a second function corresponding to the second speech command.

45. The method of claim 44, further comprising activating a main menu upon determination that a third speech command does not concern the first and the second electronic devices.

46. The method of claim 44, further comprising performing the first function and powering off the speech dialog system based on two consecutive speech commands including the first speech command and a termination speech command.

47. The method of claim 44, further comprising terminating the speech dialog system in response to a termination speech command, an operation of a hard key including a push-to-talk switch, a prolonged absence of the first, the second and the termination speech commands.

* * * * *

UNITED STATES PATENT AND TRADEMARK OFFICE
CERTIFICATE OF CORRECTION

PATENT NO. : 7,457,755 B2
APPLICATION NO. : 11/038694
DATED : November 25, 2008
INVENTOR(S) : Lars König Page 1 of 1

It is certified that error appears in the above-identified patent and that said Letters Patent is hereby corrected as shown below:

In column 13, claim 34, line 53, before "speech command." delete "the".

Signed and Sealed this

Ninth Day of June, 2009

JOHN DOLL
*Acting Director of the United States Patent and Trademark Office*